(12) United States Patent
Koss et al.

(10) Patent No.: US 11,137,159 B2
(45) Date of Patent: Oct. 5, 2021

(54) FIRE NOTIFICATION DEVICE WITH INTEGRATED ENVIRONMENTAL NODE SENSOR

(71) Applicant: Johnson Controls Technology Company, Auburn Hills, MI (US)

(72) Inventors: Richard A. Koss, Oak Creek, WI (US); Joseph Piccolo, III, Fitzwilliam, NH (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/567,773

(22) Filed: Sep. 11, 2019

(65) Prior Publication Data

US 2020/0080739 A1 Mar. 12, 2020

Related U.S. Application Data

(60) Provisional application No. 62/729,760, filed on Sep. 11, 2018.

(51) Int. Cl.
*F24F 11/33* (2018.01)
*H01Q 1/22* (2006.01)
*H04L 29/08* (2006.01)
*F24F 11/62* (2018.01)

(52) U.S. Cl.
CPC .............. *F24F 11/33* (2018.01); *F24F 11/62* (2018.01); *H01Q 1/2283* (2013.01); *H04L 67/125* (2013.01)

(58) Field of Classification Search
CPC .. A62C 2/00; F24F 11/33; F24F 11/62; H01Q 1/2283; H01Q 1/2291; H01Q 1/241; H04L 67/125
See application file for complete search history.

(56) References Cited

U.S. PATENT DOCUMENTS

| | | |
|---|---|---|
| 6,377,182 B1 | 4/2002 | Devine et al. |
| 6,798,341 B1 | 9/2004 | Eckel et al. |
| 8,994,540 B2 | 3/2015 | Fadell et al. |
| 2003/0058109 A1* | 3/2003 | Costa ............ G08B 17/00 340/573.1 |
| 2003/0234725 A1* | 12/2003 | Lemelson ....... G08B 29/186 340/521 |

(Continued)

FOREIGN PATENT DOCUMENTS

WO WO-2018/038953 A1 3/2018

OTHER PUBLICATIONS

U.S. Appl. No. 15/999,263, filed Aug. 17, 2018, Johnson Controls Technology Company.
(Continued)

*Primary Examiner* — Sisay Yacob
(74) *Attorney, Agent, or Firm* — Foley & Lardner LLP

(57) ABSTRACT

A sensor apparatus for integration with a building fire system includes a first mounting interface configured to physically couple to a mounting surface. This first mounting interface comprises a first power connector configured to receive power from the building fire system. The sensor apparatus further comprises an environmental sensor electrically coupled to the first power connector and configured to use the power from the building fire system to monitor environmental conditions of a building.

18 Claims, 13 Drawing Sheets

(56) References Cited

U.S. PATENT DOCUMENTS

| | | |
|---|---|---|
| 2004/0065451 A1* | 4/2004 | McSheffrey .......... A62C 13/76 |
| | | 169/75 |
| 2009/0163151 A1 | 6/2009 | Menden et al. |
| 2014/0340215 A1* | 11/2014 | Piccolo, III .......... G08B 29/126 |
| | | 340/514 |
| 2016/0330285 A1 | 11/2016 | Brophy et al. |
| 2017/0343231 A1 | 11/2017 | Rumler et al. |
| 2018/0299844 A1 | 10/2018 | Ray et al. |

OTHER PUBLICATIONS

U.S. Appl. No. 16/246,080, filed Jan. 11, 2019, Gamroth et al.
U.S. Appl. No. 16/449,148, filed Jun. 21, 2019, Nelson et al.
U.S. Appl. No. 16/530,976, filed Aug. 2, 2019, Johnson Controls Technology Company.

\* cited by examiner

FIRE NOTIFICATION DEVICE WITH INTEGRATED ENVIRONMENTAL NODE SENSOR

CROSS REFERENCE TO RELATED APPLICATION

This application claims the benefit of and priority to U.S. Provisional Patent Application No. 62/729,760 filed Sep. 11, 2018, the entire disclosure of which is incorporated by reference herein.

BACKGROUND

The present disclosure relates generally to building control systems and more particularly to a fire detection system (FDS) for a building. AN FDS is, in general, a system of devices configured to control, monitor, and manage equipment in or around a building or building area to detect and suppress fires. An FDS can include, for example, a fire notification system, a fire suppression system, and any other system that is capable of managing building fire safety functions or devices, or any combination thereof.

Fire detection systems generally have several sensors located in or around a building responsible for monitoring environmental conditions (e.g., temperature, humidity, smoke levels, etc.). These sensors may need to be individually installed and connected to a controller, with each sensor needing to be wired into a new location in the building. It would be beneficial to have one or more environmental sensors capable of wireless communication (i.e., sensor attachment) and may be installed and coupled directly to a fire notification device already installed in the fire detection system. Furthermore, it would be beneficial if the sensor attachment could harvest power from the fire notification device to mitigate installation time and costs.

SUMMARY

One implementation of the present disclosure is a sensor apparatus for integration with a building fire system. The sensor apparatus includes a first mounting interface configured to physically couple to a mounting surface and comprising a first power connector configured to receive power from the building fire system. The sensor apparatus further includes an environmental sensor electrically coupled to the first power connector and configured to use the power from the building fire system to monitor environmental conditions of a building.

In some embodiments, the sensor apparatus comprises a second mounting interface configured to physically couple to a fire system component and comprising a second power connector configured to provide power to the fire system component.

In some embodiments, the fire system component is a fire notification device or a fire detection device of the building fire system.

In some embodiments, the fire system component includes a third mounting interface configured to physically couple to the mounting surface. The first mounting interface of the sensor apparatus is configured to emulate the third mounting interface to enable the sensor apparatus to be physically coupled to the mounting surface.

In some embodiments, the mounting surface includes a fourth mounting interface configured to physically couple to the third mounting interface of the fire system component and the second mounting interface of the sensor apparatus is configured to emulate the fourth mounting interface to enable the sensor apparatus to be physically coupled to the third mounting interface of the fire system component.

In some embodiments, the mounting surface is a second mounting interface of a fire system component, the second mounting interface configured to physically couple to the first mounting interface and comprising a second power connector configured to provide the power from the building fire system to the sensor apparatus.

In some embodiments, the sensor apparatus includes a control board configured to electrically couple an environmental sensor to the first power connector. The control board is further configured to determine a state of the building fire system based on environmental data received by the environmental sensor. The control board is further configured to selectively provide the power from the building fire system to the environmental sensor based on the state of the building fire system.

In some embodiments, the state of the building fire system is a battery backup state and wherein the control board is configured to determine that the power from the building fire system is being received and that the power is not from a backup battery of the building fire system. The control board is further configured to operate the sensor apparatus and the fire system component on the power from the building fire system in response to determining that the power from the building fire system is not from the backup battery.

In some embodiments, the environmental sensor is further configured to monitor temperature readings or humidity levels from within the building.

In some embodiments, the power from the building fire system is a wired input from a fire panel Initiating Device Notification Appliance Circuit (IDNAC) bus.

Another implementation of the present disclosure is a building fire system including a fire system component configured to operate on power from the building fire system. The system further includes a sensor apparatus comprising an environmental sensor configured to physically couple to the fire system component such that the sensor apparatus is powered by the power from the building fire system and monitor environmental conditions of a building zone by means of the environmental sensor.

In some embodiments, the sensor apparatus is further configured to detect a loss of power from the building fire system. The sensor apparatus is further configured to determine whether an amount of energy in a backup battery of the fire system component is sufficient to power both the fire system component and the sensor apparatus. The sensor apparatus is further configured to shut down the sensor apparatus in response to determining that the amount of energy in the backup battery is insufficient to power both the fire system component and the sensor apparatus.

In some embodiments, the sensor apparatus includes a first mounting interface configured to physically couple to a mounting surface and comprising a first power connector configured to receive power from the building fire system. The sensor apparatus further includes a second mounting interface configured to physically couple to the fire system component and comprising a second power connector configured to provide power to the fire system component.

In some embodiments, the fire system component includes a third mounting interface configured to physically couple to the mounting surface and the first mounting interface of the sensor apparatus is configured to emulate the third mounting interface to enable the sensor apparatus to be physically coupled to the mounting surface.

In some embodiments, the environmental sensor is further configured to monitor temperature readings or humidity levels from within the building.

Another implementation of the present disclosure is a method for powering sensor apparatus using power from a building fire system. The method includes operating a fire system component on the power from the building fire system. The method further includes physically coupling a sensor apparatus to the fire system component such that the sensor apparatus is powered by the power from the building fire system. The method further includes conducting, by the sensor apparatus, environmental monitoring with one or more environmental sensors using the power from the building system.

In some embodiments, the environmental sensor is configured to monitor temperature readings or humidity levels from within the building.

In some embodiments, the method further includes detecting a loss of the power from the building fire system. The method further includes determining whether an amount of energy in a backup battery is sufficient to power both the fire system component and the sensor apparatus. The method further includes shutting down the environmental sensor in response to determining that the amount of energy in the backup battery is insufficient to power both the fire system component and the sensor apparatus.

In some embodiments, the fire system component is a fire suppression device, a fire notification device in a fire notification system, or a fire detection device in the building fire system.

In some embodiments, a wired connection of the sensor apparatus to the fire notification system or the fire detection system is an auxiliary connection.

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Overview

Referring generally to the FIGURES, a building management system (BMS), more specifically a fire detection system, including a modified fire notification device is shown, according to some embodiments. The fire notification device may include a sensor attachment coupled to the notification device that wirelessly transmits data to a network. The coupled sensor may be powered by the power supply from the fire alarm control panel (FACP) in the fire detection system. In some embodiments, the sensor is an environmental sensor node that connects to a fire notification device that is powered from a Johnson Controls (JCI)/Tyco Fire Panel Initiating Device Notification Appliance Circuit (IDNAC) bus and wirelessly connects to the JCI building automation system.

Retrofitting new sensors and adding new features to an existing building can be difficult and costly. Areas may need to be cleared, new devices may need to be installed, and communication and power wiring often need to be added to support a new service. This creates a barrier to selling new and innovative services. A solution to this problem may include installing fire notification devices in several rooms of a commercial building. The installed devices can be modified to include environmental sensor attachments that physically and electrically couple to the back of the devices and are powered by means of connection terminals. The attached sensor attachment may harvest power off of the same source that powers the fire notification device (e.g., IDNAC bus) without causing loading issues or disrupting system communication. This makes it easier to sell a feature upgrade of a building fire detection system by lowering the cost of installation.

This method of improvement can provide a path to sell new features in existing installations with lower upfront costs. It can also be installed without changes to the existing notification device, since the device sits between the back plate and the notification device and can be installed as a temporary solution to show the customer the value of the feature. This concept for the environmental sensor attachment can be expanded to perform with other sensors and other devices.

Building Management System

Figure 1:
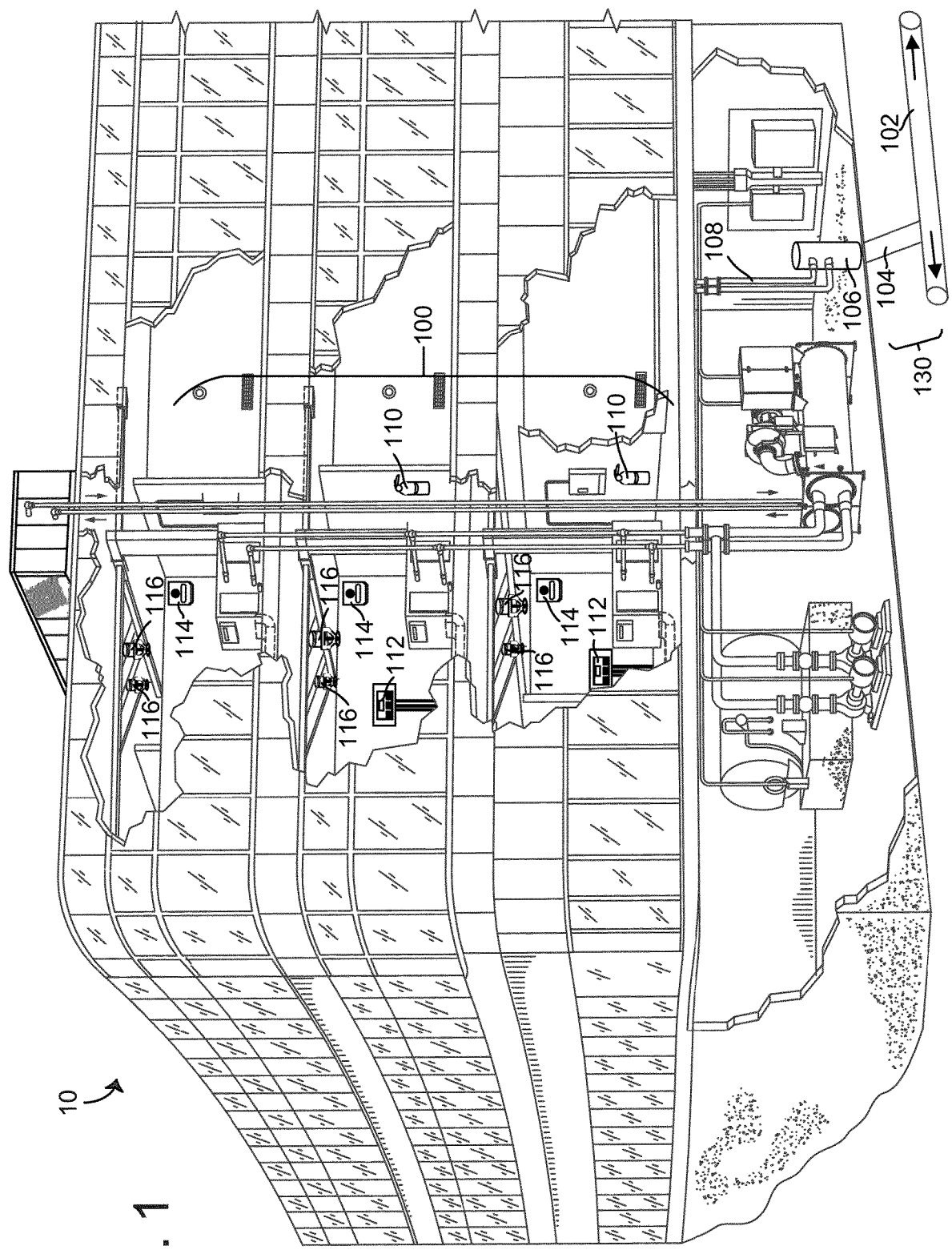
FIG. 1 is a drawing of a building equipped with a building management system (BMS) and a fire system, according to some embodiments.

Referring now to FIGS. 1-4, an example building management system (BMS) and fire suppression system in which the systems and methods of the present disclosure can be implemented are shown, according to an example embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a fire suppression system, a security system, a lighting system, a fire detection system, any other system that is capable of managing building functions or devices, or any combination thereof.

The BMS that serves building 10 includes a fire system 100. Fire system 100 can include a plurality of fire suppression devices (e.g., notification devices, sprinklers, fire alarm control panels, fire extinguishers, water systems etc.) configured to provide detection, suppression, notification to building occupants, or other services for building 10. For example, fire system 100 is shown to include water system 130. Water system 130 can act as the system in which building 10 receives water from a city line 102 through a building line 104 to suppress fires. In some embodiments, a main water line 302 can be the dominant piping system that distributes water throughout one or more of the building floors in building 10. This can be done through a piping system 108.

Fire system 100 can also include fire detection devices, such as sprinklers 116, fire notification devices 114, fire alarm control panels 112, and fire extinguishers 110. Sprinklers 116 may be connected to piping system 108 and serve as one of the corrective actions taken by the BMS to suppress fires. In some embodiments, sprinklers 116 can engage in suppressive action using dry agents (nitrogen, air, etc.) instead of water. Fire extinguishers 110 can be any portable devices capable of discharging a fire suppressing agent (e.g., water, foam, gas, etc.) onto a fire. Building 10 may include fire extinguishers 110 on several floors in multiple rooms.

Fire notification devices 114 can be any devices capable of relaying audible, visible, or other stimuli to alert building occupants of a fire or other emergency condition. In some embodiments, fire notification devices 114 are powered by Initiating Device Notification Alarm Circuit (IDNAC) power from fire alarm control panel 112. In other embodiments, fire notification devices 114 may be powered by a DC power source (e.g., a battery) or an external AC power source. Fire notification devices 114 can include a light notification module and a sound notification module. The light notification module can be implemented as any component in fire notification devices 114 that alerts occupants of an emergency by emitting visible signals. In some embodiments, fire notification devices 114 emit strobe flashes at least 60 flashes per minute to alert occupants of building 10 of an emergency situation. A sound notification module can be any component in fire notification devices 114 that alerts occupants of an emergency by emitting audible signals. In some embodiments, fire notification devices 114 emit signals ranging from approximately 500 Hz (low frequency) to approximately 3 kHz (high frequency).

Fire alarm control panel 112 can be any computer capable of collecting and analyzing data from the fire notification system (e.g., building controllers, conventional panels, addressable panels, etc.). In some embodiments, fire alarm control panel 112 is directly connected to fire notification device 114 through IDNAC power. Fire alarm control panel 112 can be communicably connected to a network for furthering the fire suppression process, including initiating corrective action in response to detection of a fire. In other embodiments, sensors transmitting data to fire alarm control panel 112 (temperature sensors, smoke sensors, humidity sensors, etc.) may be directly connected to sprinkler heads and will initiate the engagement of the sprinkler system independent of a command from fire alarm control panel 112.

Figure 2:
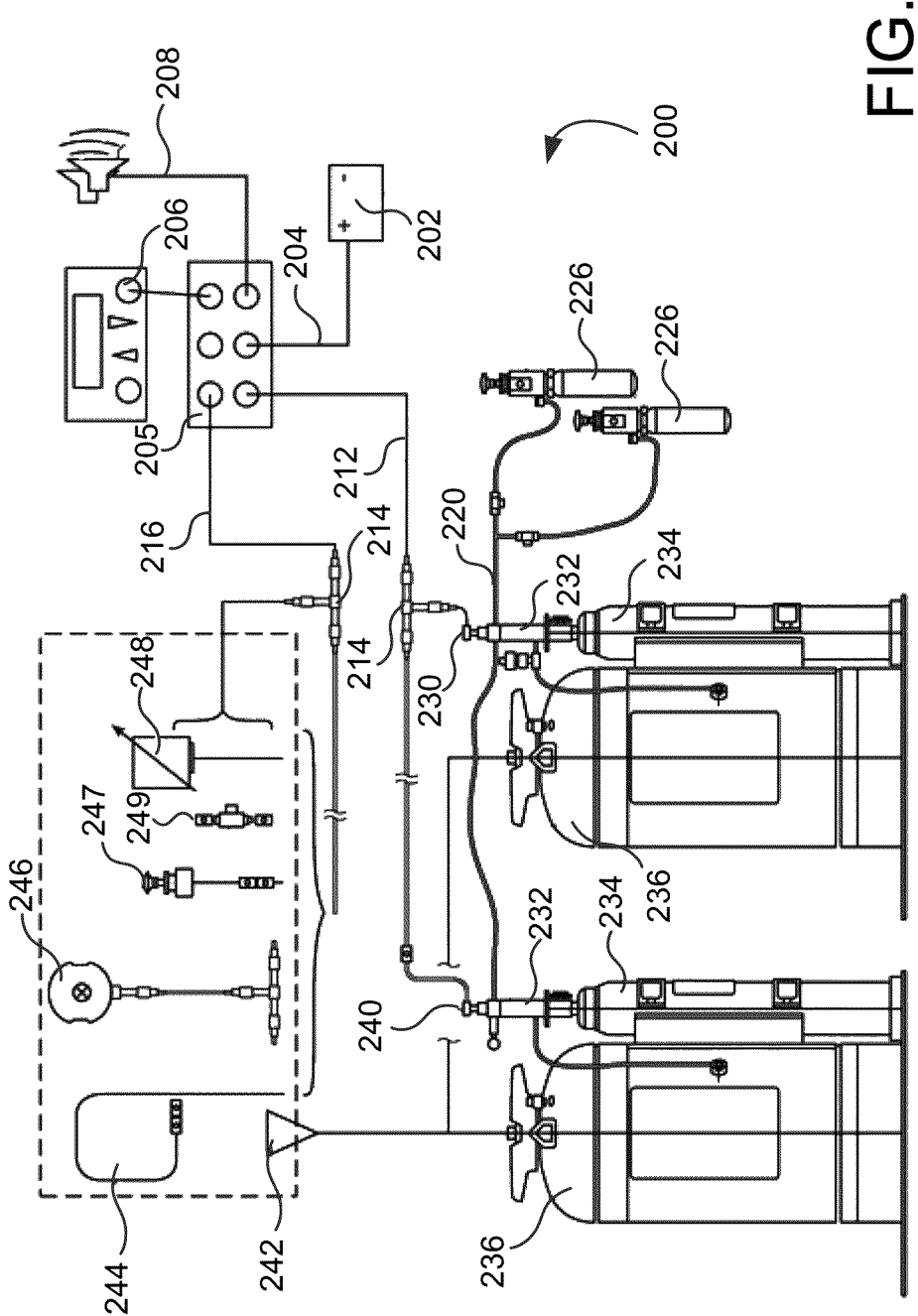
FIG. 2 is a schematic of a fire suppression system which can be used as part of the fire system of FIG. 1, according to some embodiments.

Referring now to FIG. 2, a schematic illustration of a suppression system 200 is shown, according to an exemplary embodiment. Suppression system 200 is shown to include one or more storage tanks 236 coupled to fixed nozzles 242. Storage tanks 236 and fixed nozzles 242 may act as the assemblies configured to suppress fires. In some embodiments, storage tank 236 includes a fire fighting agent (e.g., ware, chemicals, foam, etc.). Storage tanks 236 can include an attached pressurized cylinder 234 and rupturing device 232 to their respective tanks which are configured to pressurize storage tanks 236 for delivery of the fire fighting agent. The fire fighting agent can be configured to be under an operating pressure that can output to nozzle 242 to suppress a fire. Rupturing device 232 can be configured to puncture a rupture disc of a pressurized cylinder 234, where pressurized cylinder 234 may contain a pressurized gas (e.g., nitrogen) to pressurize storage tanks 236 for the delivery of the fire fighting agent.

To operate rupturing device 232, suppression system 200 can provide for automatic actuation and manual operation of rupturing device 232 to provide for respective automated and manual delivery of the fire fighting agent in response to detection of a fire. Rupturing device 232 (e.g., a rupturing or actuating device or assembly) may include a puncturing pin or member that is driven into the rupture disc of pressurized cylinder 234 for release of the pressurized gas. The puncturing pin of rupturing device 232 may be driven electrically or pneumatically to puncture the rupture disc of the pressurized cylinder 234.

In other embodiments, rupturing device 232 acts as an actuating device that includes a protracted actuation device (PAD) 240 for driving the puncturing pin of the assembly into the rupture disc. PAD 240 generally includes an electrically coupled rod or member that is disposed above the puncturing pin. When an electrical signal is delivered to PAD 240, the rod of PAD 240 is driven directly or indirectly into the puncturing pin which punctures the rupture disc of pressurized cylinder 234. An example of a potential pressurized cylinder assembly which can be used in system 200 is described in detail in U.S. Provisional Patent Application Ser. No. 61/704,551 and shows a known rupturing device for either manual and pneumatic or automatic electrical operation to drive a puncture pin. Suppression system 200 provides for automatic and manual operation of PAD 240. In some embodiments, suppression system 200 includes PADs and rupture discs. In other embodiments, suppression system 200 provides for electric manual operation of PAD 240 as explained in greater detail below. Suppression system 200 can further provide for one or more remote manual operating stations 226 to manually actuate suppression system 200. Manual operating stations 226 can rupture a canister of pressurized gas, (e.g., nitrogen at 1800 psi), to fill and pressurize an actuation line which in turn drives the puncturing pin of rupturing device 232 into the rupturing disc thereby actuating suppression system 200.

Still referring to FIG. 2, suppression system 200 is shown to include a centralized controller for automated and manual operation and monitoring of system 200. More specifically, suppression system 200 may include the centralized controller or an interface control module (ICM) 205. In some embodiments, a display device 206 is coupled to ICM 205. Display device 206 can display information to a user and provide for user input to ICM 205. An audio alarm or speaker 208 may also be coupled to ICM 205 to provide for an audio alert regarding the status of suppression system 200. In some embodiments, an audio alarm or sounder is incorporated into the housing of display device 206 and configured to operate in a wet environment.

To provide for fire detection and actuation of rupturing device (i.e., actuating device) 232 and the fire protection system, ICM 205 may include an input data bus 216 coupled to one or more detection sensors, an output data bus 212 coupled to PADs 240, and an input power supply bus 204 for powering ICM 205. The control and actuating signals as explained in greater detail below. Input bus 216 may provide for interconnection of digital and analog devices to the ICM 205; and in some embodiments includes one or more fire detection devices and preferably at least one manual actuating device 247. Suppression system 200 can include several analog and digital devices for various modes for fire detection including: (i) spot thermal detectors 249 to determine when the surrounding air exceeds a set temperature, (ii) linear detection wire 244 which conveys a detection signal from two wires that are brought into contact upon a separating insulation material melting in the presence of a fire, (iii) optical sensors 246 which differentiate between open flames and hydrocarbon signatures, and (iv) a linear pressure detector 248 in which pressure of an air line increases in the presence of sufficient heat. Manual actuating device 247 can be a manual push button which sends an actuating signal to ICM 20 for output of an electrical actuating signal along to PAD 240. Accordingly, suppression system 200 provides for manual actuation of system 200 via an electrical signal to PAD 240. Together the detection and manual actuating devices (i.e., spot thermal detector 249, linear detection wire 244, optical sensors 246, and linear pressure detector 248) define a detecting circuit of suppression system 200 of either an automatic or manual detection of a fire event.

Devices of input bus 216 may be interconnected by two or more interconnected connection cables which may include one or more sections of linear detection wire 244. The cables can be connected by connectors 214. The connection cable of input bus 216 can be coupled to ICM 205. The connection cables of input bus 216 and output bus 212 may define closed electrical circuits with the ICM 205. Accordingly, a bus may include one or more branch terminators (e.g., the end of a linear detection wire). Additionally, the detecting circuit can include an end of line element which terminates the physically furthest end of the input bus and monitors the detecting circuit of suppression system 200. The detection devices (i.e., spot thermal detector 249, linear detection wire 244, optical sensors 246, and linear pressure detector 248) may be digital devices for direct communication with ICM 205.

ICM 205 may be a programmable controller having a microprocessor or microchip. ICM 205 may receive input signals on input bus 216 from the detection devices for processing and where appropriate, generating an actuating signal to PAD 240 along the output bus 212. Moreover, the processor can be configured for receiving feedback signals from each of the input and output buses to determine the status of the system and its various components. More specifically, ICM 205 may include internal circuitry to detect the status of the input bus, i.e., in a normal state, ground state, whether there is an open circuit, or whether there has been a signal for manual release.

Figure 3:
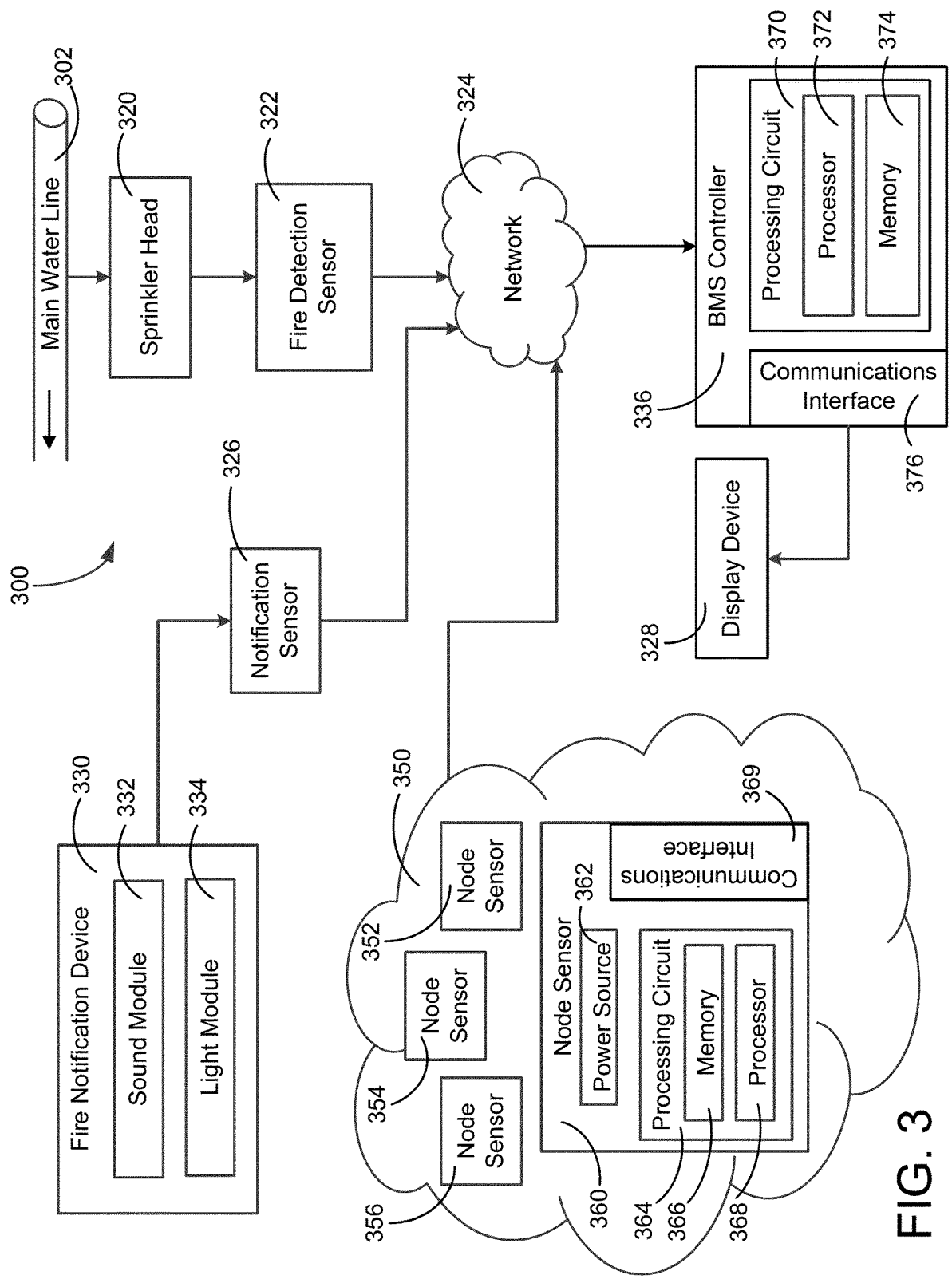
FIG. 3 is a block diagram of a fire detection system which can be used as part of the fire system of FIG. 1, according to some embodiments.

Referring now to FIG. 3, fire detection system 300 is shown, according to an exemplary embodiment. Fire detection system 300 can be included in the BMS inside of building 10 and may be included in fire system 100. Fire detection system 300 can be any type of system that analyzes data inputs (e.g., sensor data) to detect a fire. Fire detection system 300 is shown to include fire notification device 330, BMS controller 336, and network 324.

Fire notification device 330 can be any device capable of relaying an audible, visible, or other stimuli to alert building occupants of a fire or other emergency condition. Fire notification device 330 is shown to include a light notification module 334 and a sound notification module 332. Light notification module 334 can be implemented as any component in fire notification device 330 that alerts occupants of an emergency by emitting visible signals. In some embodiments, light notification module 334 emits strobe flashes at least 60 flashes per minute to alert occupants of building 10 of an emergency situation. Sound notification module 332 can be any component in fire notification device 330 that alerts occupants of an emergency by emitting audible signals. In some embodiments, sound notification module 332 emits signals ranging from approximately 500 Hz (low frequency) to approximately 3 kHz (high frequency). Fire notification device 330 can be connected to notification sensor 338. Notification sensor 338 can be any type of sensor that is communicably coupled to both fire notification device 330 and network 446. In some embodiments, notification sensor 338 is coupled directly to fire notification device 330 and draws power from the power source of fire notification device 330. For example, notification sensor 338 can be powered by the IDNAC power and communications output by a control panel that is powering fire notification device 330. Notification sensor 338 can then output environmental data (e.g., temperature, humidity, etc.) to network 446.

Fire detection system 300 is further shown to include mesh cloud 350. Mesh cloud 350 may function as any type of mesh network in which one or more nodes of the network route data to a location for analysis. In some embodiments, node sensors 352, 354, 356, 360 wirelessly route data to network 446. Node sensor 360 is shown to include a power source 362, a processing circuit 364, and a communications interface 369. Power source 362 may include a battery attached to node sensor 360, an external AC power source wired to node sensor 360, or a combination of both. In some embodiments, node sensor 360 may act as any active electronic device in a wireless mesh network that aids in moving and/or producing data. For example, node sensor 360 communicates with node sensor 356 and routes data to BMS controller 336 through network 446. In other embodiments, other nodes in mesh cloud 350 may be directly connected to sprinklers in fire detection system 300. In other embodiments, node sensors in mesh cloud 350 may be directly integrated into components of sprinklers in building 10.

Communications interface 369 may include wired or wireless communications interfaces (e.g., jacks, antennas, transmitters, receivers, transceivers, wire terminals, etc.) for conducting data communications with building subsystems 428 or other external systems or devices. In various embodiments, communications via interface 369 can be direct (e.g., local wired or wireless communications) or via a communications network 446 (e.g., a WAN, the Internet, a cellular network, etc.). For example, interface 369 can include an Ethernet card and port for sending and receiving data via an Ethernet-based communications link or network. In another example, interface 369 can include a Wi-Fi transceiver for communicating via a wireless communications network. In another example, communications interface 369 can include cellular or mobile phone communications transceivers. In various embodiments, communications interface 369 can be a power line communications interface or an Ethernet interface.

Processing circuit 364 is shown to include a processor 368 and memory 366. Processor 368 can be implemented as a general purpose processor, an application specific integrated circuit (ASIC), one or more field programmable gate arrays (FPGAs), a group of processing components, or other suitable electronic processing components. Memory 366 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 366 can be or include volatile memory or non-volatile memory. Memory 366 can include database components, object code components, script components, or any other type of information structure for supporting the various activities and information structures described in the present application. According to an example embodiment, memory 366 is communicably connected to processor 368 via processing circuit 364 and includes computer code for executing (e.g., by processing circuit 364 and/or processor 368) one or more processes described herein.

Fire detection system 300 is further shown to include sprinkler head 320, fire detection sensor 322 and main water line 302 that may be used as part of fire detection system 300. For example, main water line 302 is supplying water to sprinkler head 320. Fire detection sensor 322 is directly coupled to sprinkler head 320 and will initiate corrective action from sprinkler head 320 (i.e., release water from sprinkler head) if abnormal signal data is being received that would indicate a fire (e.g., high temperate data, smoke detection data, etc.). In other embodiments, fire detection sensor 322 may send data to BMS controller 336 through network 324 to be analyzed and, if BMS controller 336 detects abnormal signal data that would indicate a fire, transmit a signal to sprinkler head 320 to initiate corrective action. This embodiment may be performed so as to collect all fire detection data in a central controller.

Fire detection system 300 is shown to include network 324. Network 324 can be any communications network that allows the nodes in network 446 to share information. Nodes in network 324 (e.g., computers, phones, servers, sensors, transponders, etc.) may connect via wired connection or wireless connection. Network 324 may also be connected to several more fire detection and fire suppression components (e.g., sprinkler systems, emergency response systems, HVAC systems, etc.) that aid in the detection and suppression of fires. In fire detection system 300, this information may include temperature data, smoke detection signals, humidity data, or any other type of information relating to the detection and suppression of fires.

BMS controller 336 can act as any type of controlling unit that collects data from detection system 300. BMS controller 336 is shown to include a communications interface 376 and processing circuit 370.

Communications interface 376 may include wired or wireless communications interfaces (e.g., jacks, antennas, transmitters, receivers, transceivers, wire terminals, etc.) for conducting data communications with building subsystems 428 or other external systems or devices. In various embodiments, communications via interface 376 can be direct (e.g., local wired or wireless communications) or via a communications network 446 (e.g., a WAN, the Internet, a cellular network, etc.). For example, interface 376 can include an Ethernet card and port for sending and receiving data via an Ethernet-based communications link or network. In another example, interface 376 can include a Wi-Fi transceiver for communicating via a wireless communications network. In another example, communications interface 376 can include cellular or mobile phone communications transceivers. In various embodiments, communications interface 376 can be a power line communications interface or an Ethernet interface.

Processing circuit 370 is shown to include a processor 372 and memory 374. Processor 372 can be implemented as a general purpose processor, an application specific integrated circuit (ASIC), one or more field programmable gate arrays (FPGAs), a group of processing components, or other suitable electronic processing components. Memory 374 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 374 can be or include volatile memory or non-volatile memory. Memory 374 can include database components, object code components, script components, or any other type of information structure for supporting the various activities and information structures described in the present application. According to an example embodiment, memory 374 is communicably connected to processor 372 via processing circuit 370 and includes computer code for executing (e.g., by processing circuit 370 and/or processor 372) one or more processes described herein.

Display device 328 can be any type of video or audio system that displays information about fire detection system 300 to a user and can be communicably connected to communications interface 376 of BMS controller 336. In some embodiments, display device 328 can act as a computer with fire detection information (charts, data, etc.) outputted onto a user interface. In other embodiments, display device may act signal that is transmitted to building occupants in the case of an emergency.

Figure 4:
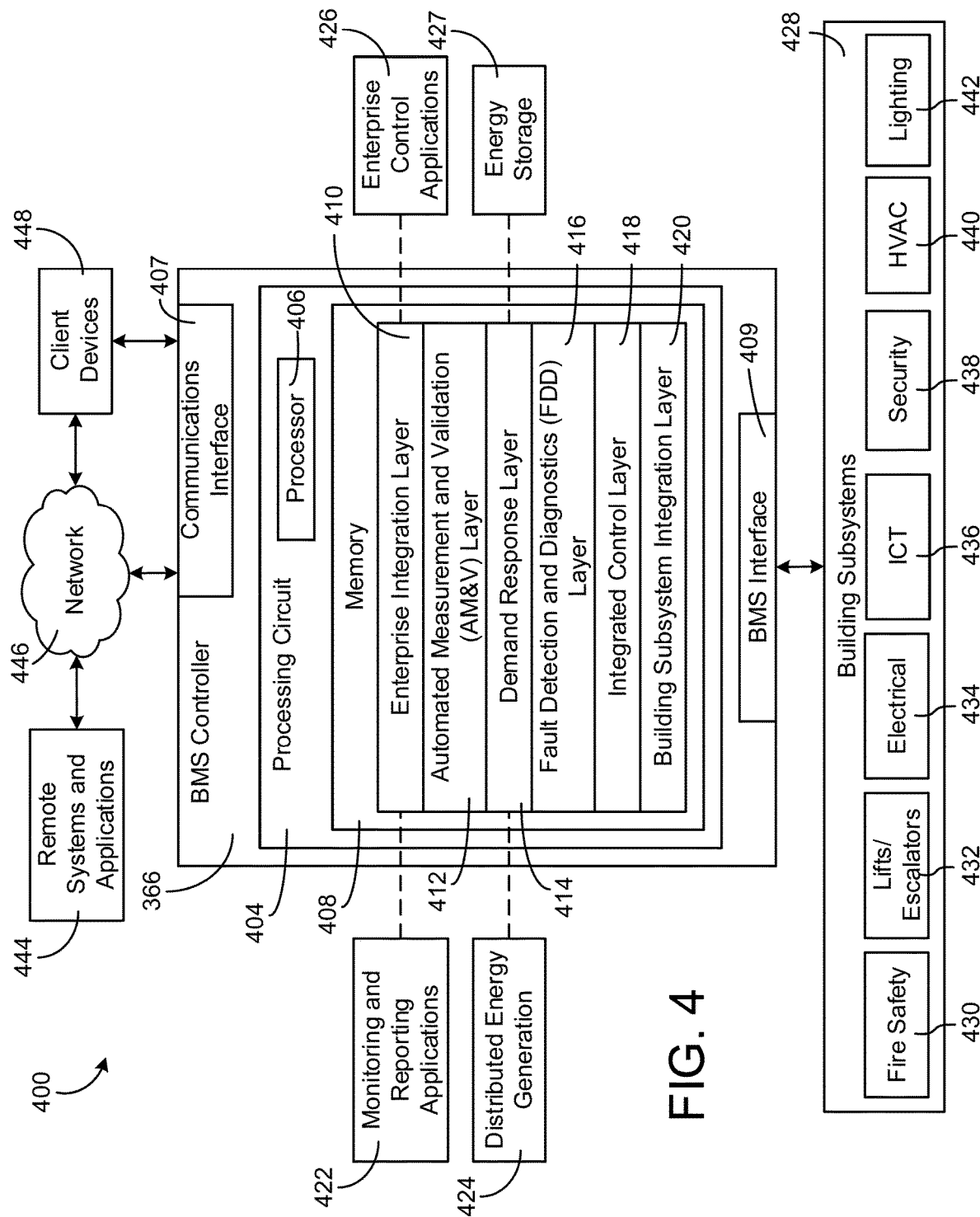
FIG. 4 is a block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., sub-plants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Fire Notification System

Figure 5:
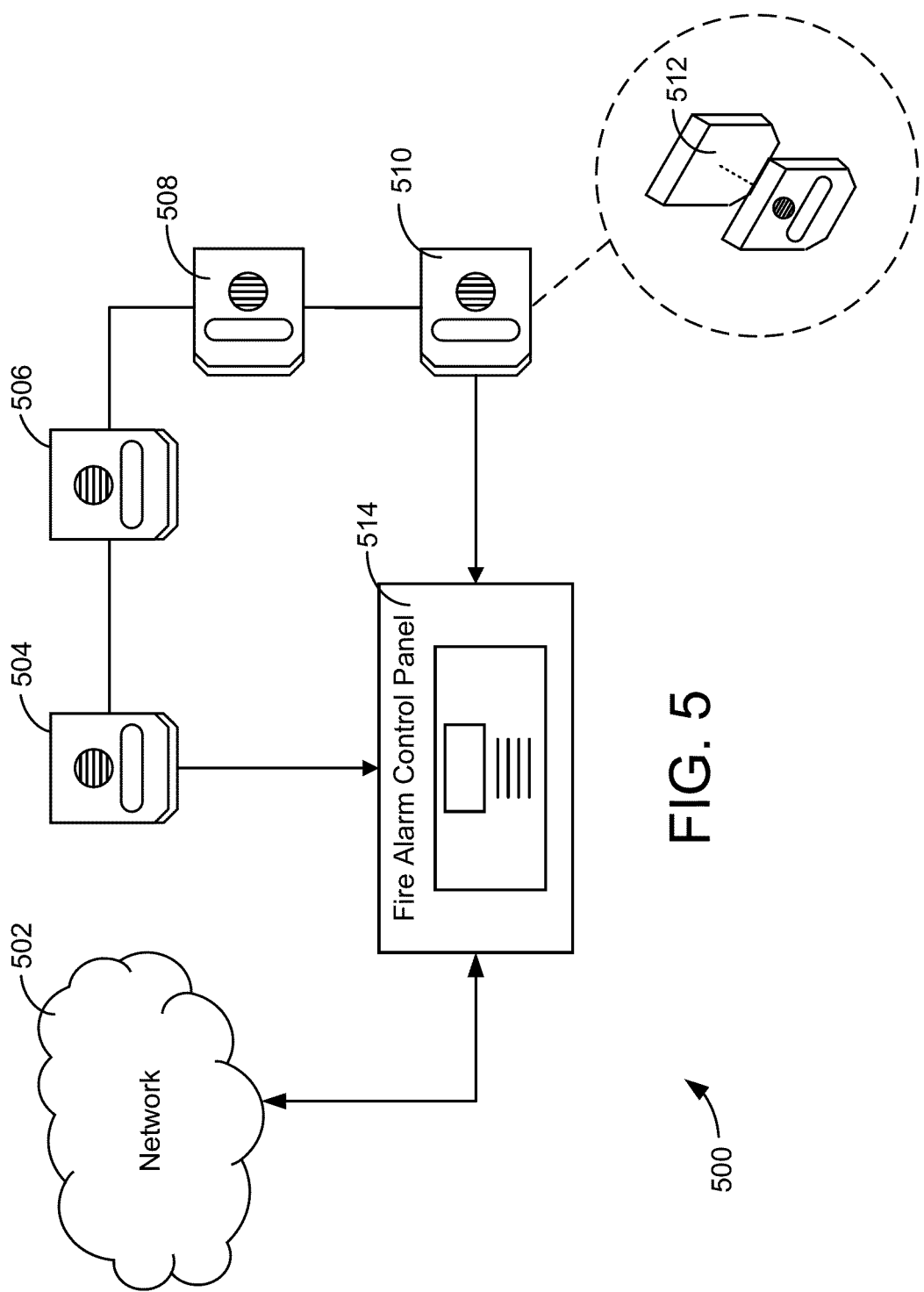
FIG. 5 is a fire detection system which can be used as part of the BMS of FIG. 4, according to some embodiments.

Referring now to FIG. 5, a fire notification system 500 is shown, according to an exemplary embodiment. Fire notification system 500 can be any system that includes a controlling unit (e.g., building controller, control panel, etc.), a network, and one or more notification devices. System 500 may be similar to or fully incorporated by BMS 400. System 500 is shown to include network 502, fire notification devices 504-510, and fire alarm control panel 514. System 500 may be part of a METASYS® brand building management system as sold by Johnson Controls, Inc.

Network 502 may be identical or substantially similar to network 446. Network 502 can be connected wired or wirelessly to fire alarm control panel 514 by means of a communications interface. Network 502 can be any digital telecommunications network that allows the nodes (i.e., notification devices, sensor attachments, etc.) in network 502 to share information. Network 446 may also be connected to several more fire detection and fire suppression components (e.g., sprinkler systems, emergency response systems, HVAC systems, etc.) and may facilitate communications between the devices of fire notification system 500 (e.g., fire alarm control panel 514, environmental sensor attachment 606, etc.) and various other systems or devices outside fire notification system 500. For example, network 502 can be connected to fire alarm control panel 514 to provide fire data to BMS 400 that manages building 10 to facilitate non-life safety reporting and maintenance. In some embodiments, network 502 is used to communicate data collected by non-fire sensors of environmental sensor attachment 606 to other systems of the BMS. For example, environmental sensor attachment 606 may collect temperature data, humidity data, or any other type of sensor data that indicates an environmental condition within building 10. Such data can be sent to other components of the BMS (e.g., a HVAC subsystem or controller) via network 502 to allow the other components of the BMS to make use of the non-fire data collected by environmental sensor attachment 606.

Fire alarm control panel 514 may be configured receive information from a plurality of notification devices and monitors or controls fire suppression building equipment. In some embodiments, fire alarm control panel 514 is configured to support up to several thousand points, emergency voice communication, self-testing notification appliances, and/or IP based networking. In some embodiments, fire alarm control panel 514 is a SIMPLEX® Panel as sold by Johnson Controls, Inc. Fire alarm control panel 514 may monitor one or more other smaller fire alarm control panels wherein the smaller panels handle a smaller subset of points and relay information to fire alarm control panel 514. In some embodiments, fire alarm control panel 514 may be supplied with IDNAC power and communication and may allow fire notification device 504-510 to operate at higher voltages with lower current levels ensuring a constant current draw. Fire alarm control panel 514 can be communicably connected to network 502 to facilitate communication between the fire alarm control panel 514 and BMS 400. In some embodiments, fire alarm control panel 514 can be used for monitoring and reporting of fire data to the BMS and for the integration of BMS equipment within system 500. In some embodiments, fire alarm control panel 514 may use data collected from various sensors of system 500 (e.g., temperature sensors, smoke sensors, humidity sensors, etc.) to initiate the engagement of a sprinkler system or other fire suppression system.

Fire notification devices 504-510 may be similar to that of fire notification devices 114. In some embodiments, system 500 may include any number of fire alarm notification devices in addition to or in place of fire notification devices 504-510. Notification device 530 can be any device capable of relaying an audible, visible, or other stimuli to alert building occupants of a fire or other emergency condition. Fire notification devices 504-510 can include some or all of the components and/or functionality of notification device 114, as shown in FIG. 1. In some embodiments, notification devices 504-510 are powered by IDNAC power from fire alarm control panel 514. In other embodiments, the devices may be powered by a DC power source (e.g., a battery) inside any of the components between a front cover and mounting plate of the notification device. Fire notification devices 504-510 may be similar to that of a SIMPLEX TrueAlert® notification appliance, as sold by Johnson Controls, Inc.

Figure 6:
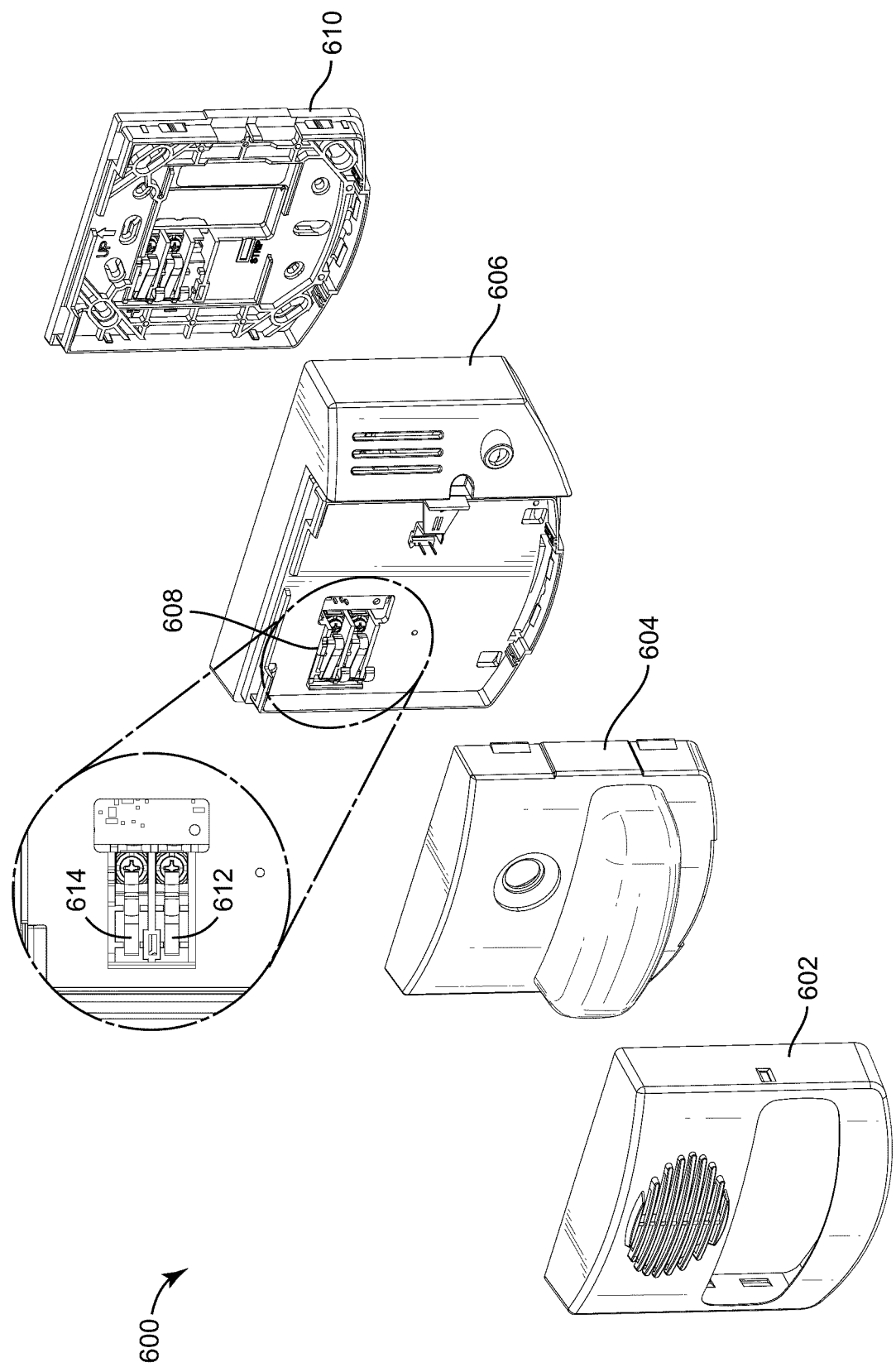
FIG. 6 is an exploded view of a fire notification device which can be used as part of the fire detection system of FIG. 5, according to some embodiments.

In some embodiments, a fire notification device within system 500, either alone or with environmental sensor attachment 512, may act as a sensor apparatus. A sensor apparatus may refer to any component or device within building 10 that may be installed and/or modified. For example, the assembly 600 as shown in FIG. 6 for a fire notification device with an integrated environmental sensor attachment may be referred to as a sensor apparatus. A sensor apparatus may also act as an environmental sensor attachment as disclosed in FIGS. 6-8.

Fire notification devices 504-510 may also act as access points (i.e., nodes). In some embodiments, an access point may be any node of network 502 that allows a device to connect to network 502 through a wireless connection. Fire notification devices 504-510 may connect via a wired connection to network 502 by means of a router, or may act as an integral component of the router itself (e.g., a mesh cloud). In some embodiments, fire notification devices 504-

510 include wireless communication modules that allow them to transmit information to network 502.

Still referring to FIG. 5, system 500 is shown to include environmental sensor attachment 512. Environmental sensor attachment 512 can be any type of environmental sensor (e.g., temperature, humidity, etc.) capable of coupling to a pre-installed fire notification device. Fire notification devices 504-510 may each be coupled to a similar attachment to that of environmental sensor attachment 512. In some embodiments, each fire notification device 504-510 in system 500 is coupled to a separate attachment similar to that of environmental sensor attachment 512. In other embodiments, only certain devices in system 500 are modified to include an attachment identical or substantially similar to environmental sensor attachment 512. These devices may be located in certain building zones (e.g., building floors, temperature sensitive regions of a building, etc.) that benefit more from additional environmental sensors.

Referring now to FIG. 6, an exploded view of a notification device assembly 600 is shown. Assembly 600 may incorporate features of a fire notification device in system 500 such as device 510 as shown in FIG. 5. Assembly 600 is shown to include a front cover 602, notification device 604, environmental sensor attachment 606, and mounting plate 610. Front cover 602 can include any protective or decorative component that encompasses the front and/or sides of notification device 604. In some embodiments, front cover 602 may resemble the traditional plastic red cover found in most notification devices in commercial or industrial buildings. Front cover 602 may mechanically couple to the exterior of notification device 604. Mounting plate 610 can be the portion of notification device assembly 600 to which environmental sensor attachment 606 is anchored. In some embodiments, mounting plate 610 may be mounted to the walls or ceilings of building 10.

Environmental sensor attachment 606 is shown to include electrical connector 608. Electrical connector 608 may include any combination of connector points that allow environmental sensor attachment 606 to couple to both the backside of notification device 604 and the front of mounting plate 610. Electrical connector 608 is shown to include terminals 612, 614. Terminals 612, 614 may be configured to connect the power and communication lines from fire notification device 604 to environmental sensor attachment 606. Each terminal may act as the connector for a separate means of supply. For example, terminal 612 may allow power to run from the IDNAC bus to fire notification device 604 and environmental sensor attachment 606 simultaneously, while terminal 614 allows communication lines from the IDNAC bus to run through fire notification device 604 and environmental sensor attachment 606 simultaneously. Electrical connector 608 and terminals 612, 614 may act as electrical conductors, capable of continuing an electrical circuit for power and communications within a system. In some embodiments, terminals 612, 614 act as electrical conductors for power and communication lines from the IDNAC bus.

Figure 7A:
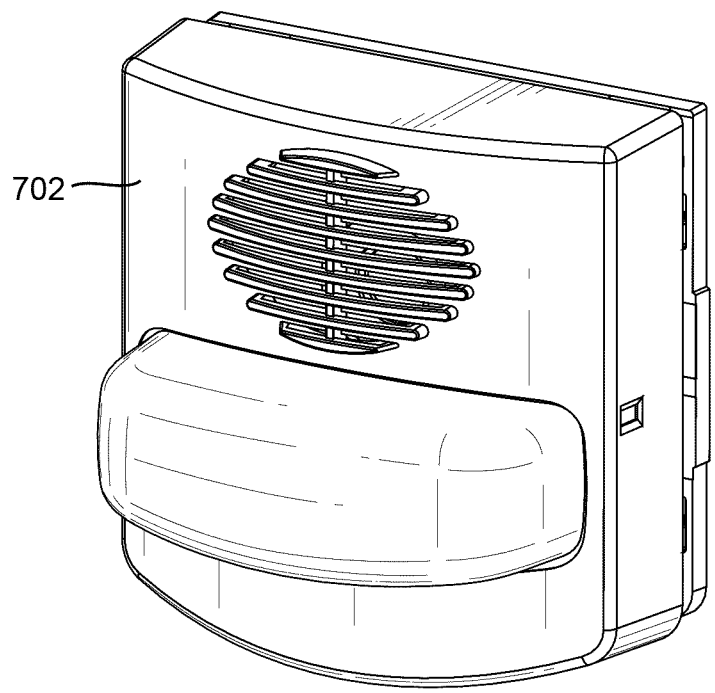
FIG. 7A is a schematic of the front side of a fire notification device which can be used as part of the fire notification device of FIG. 6, according to some embodiments.
Figure 7B:
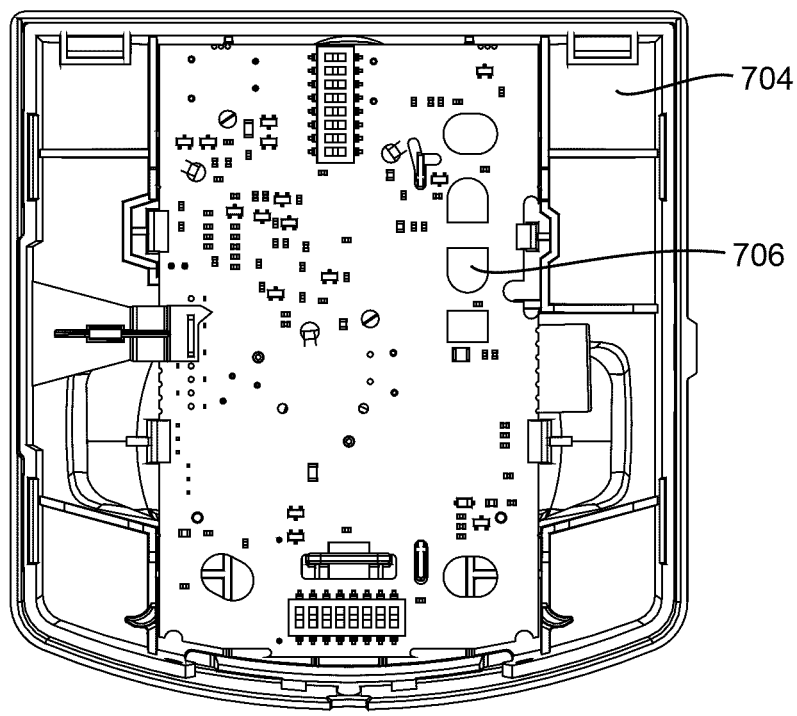
FIG. 7B is a schematic of the back side of a fire notification device which can be used as part of the fire notification device of FIG. 6, according to some embodiments.
Figure 7C:
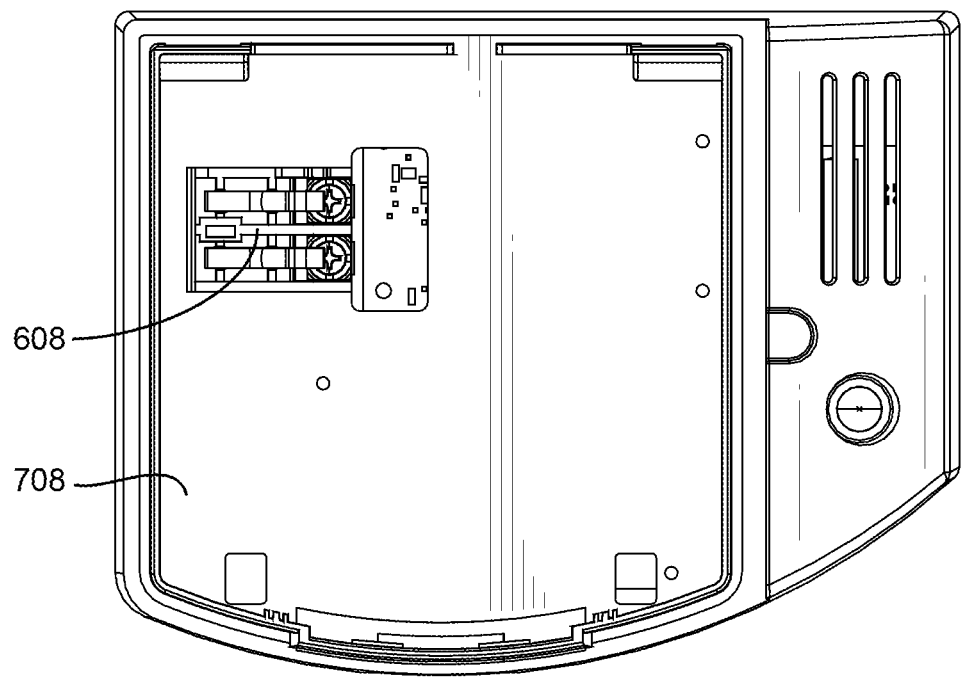
FIG. 7C is a schematic of the front side of a sensor attachment which can be used as part of the fire notification device of FIG. 6, according to some embodiments.
Figure 7D:
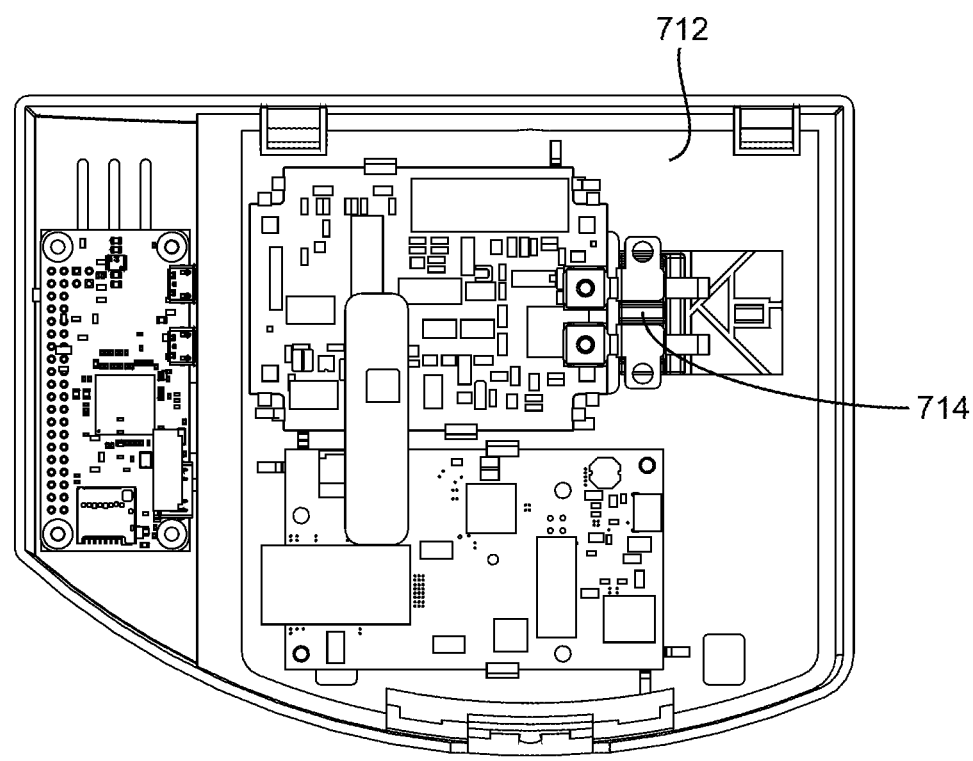
FIG. 7D is a schematic of the back side of a sensor attachment which can be used as part of the fire notification device of FIG. 6, according to some embodiments.
Figure 7F:
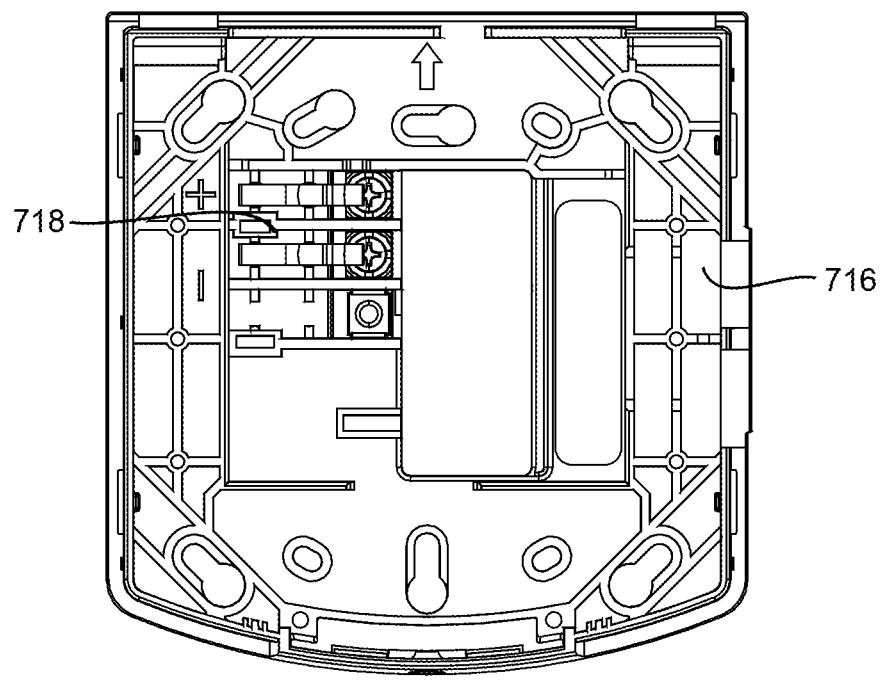
FIG. 7F is a schematic of the back side of a fire notification device mounting plate which can be used as part of the fire notification device of FIG. 6, according to some embodiments.
Figure 7E:
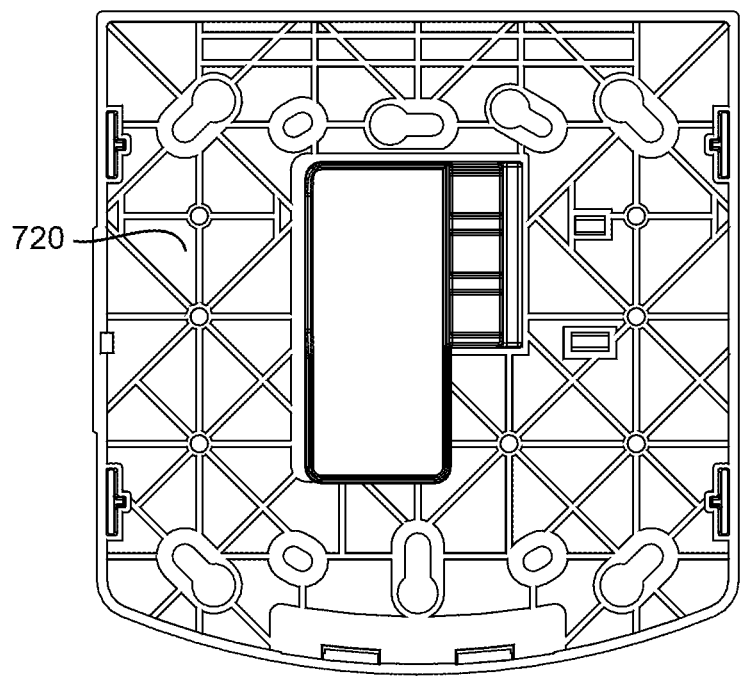
FIG. 7E is a schematic of the front side of a fire notification device mounting plate which can be used as part of the fire notification device of FIG. 6, according to some embodiments.

Referring now to FIGS. 7A-F, a front and back view of components from assembly 600 are shown, according to an exemplary embodiment. In some embodiments, the components shown are identical or substantially similar to those as shown in assembly 600 in FIG. 6. FIGS. 7A-B show the front side 702 of fire notification device 604 and back side 704 of fire notification device 604. FIGS. 7C-D show the front side 708 of environmental sensor attachment 606 and the back side 704 of environmental sensor attachment 606. FIGS. 7E-F are show the front side 716 of mounting plate 610 and the back side 720 of mounting plate 610. The font and back sides of the components shown in FIGS. 7A-F may be considered interfaces, wherein the physical or electrical connections located on the component may be considered mounting interfaces.

Referring now to FIG. 7B, back side 704 of fire notification device 604 further shows electrical connector 706. In some embodiments, electrical connector 706 may connect to another electrical connector located on the front side of environmental sensor attachment 710, such as the electrical connector 608 as shown in FIG. 6. Referring now to FIG. 7C, front side 708 of environmental sensor attachment 606 is shown to include electrical connector 608. Back side 712 of environmental sensor attachment 606 in FIG. 7D is shown to include electrical connector 714. In some embodiments, electrical connector 714 may be connected to another electrical connector (e.g., electrical connector 718) on the front side 716 of mounting plate 610.

The configuration of the electrical connectors 608, 714, and 718 may provide the capability for a method of easily introducing or removing a sensor attachment within the device. For example, if assembly 600 as shown in FIG. 6 removed environmental sensor attachment 606, then the back side 704 of notification device 604 may connect to the front side 716 of mounting plate 610. If environmental sensor attachment 606 is reinstalled within assembly 600, front side 708 of environmental sensor attachment 606 connects to back side 704 of notification device 604 and back side 712 of environmental sensor attachment 606 connects to front side 716 of mounting plate 610. In this sense, "connect" can refer to any type of coupling that provides an electrical conduit between the two components and allows for a completed electrical circuity and the passing of electrical signals (e.g., voltage, communications, error signals, etc.).

Figure 8:
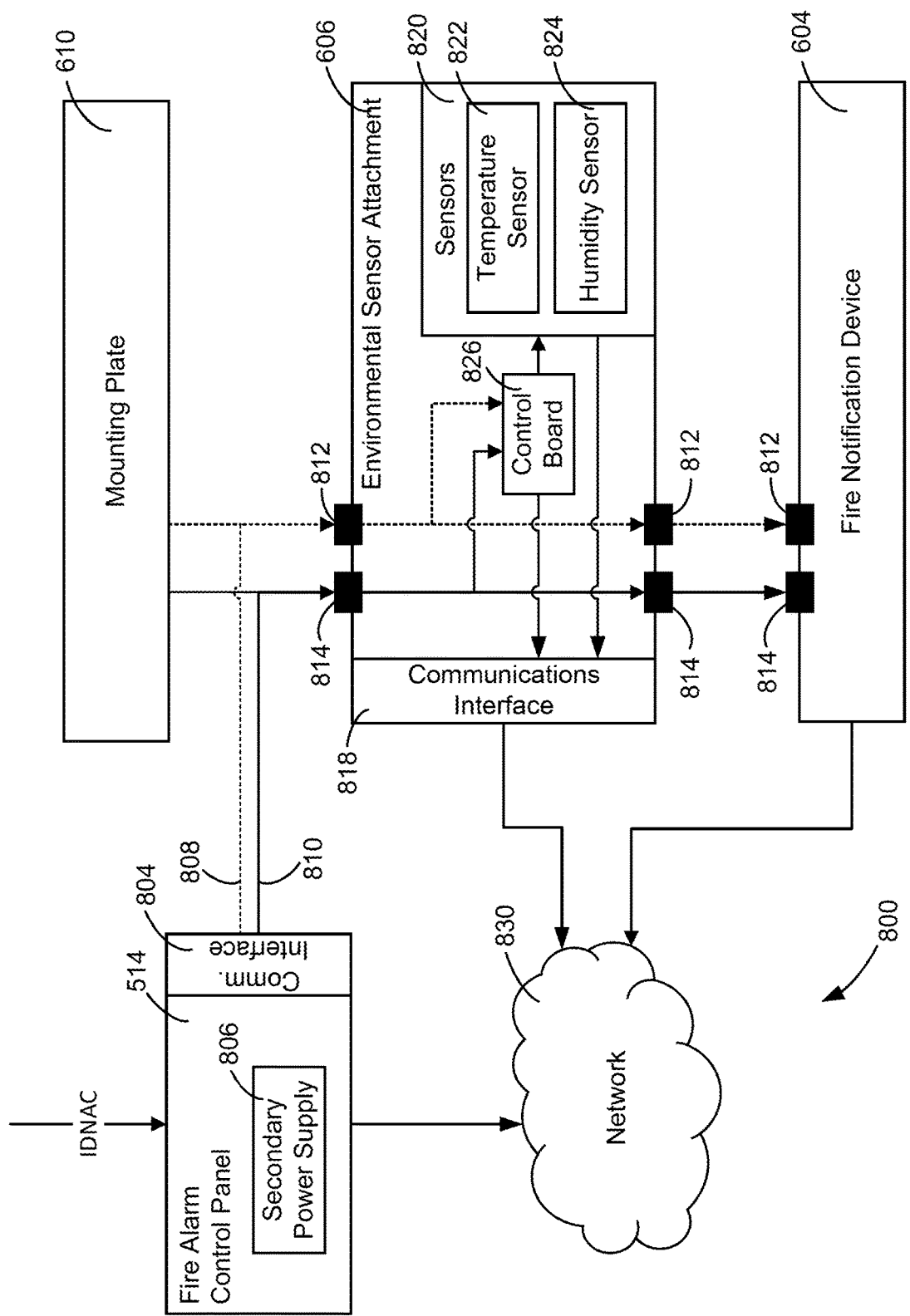
FIG. 8 is a block diagram of a fire detection system, which can be used as part of the BMS of FIG. 4, according to some embodiments.

Referring now to FIG. 8, a fire notification system 800 is shown, according to an exemplary embodiment. System 800 is shown to include fire alarm control panel 514, network 830, mounting plate 610, environmental sensor attachment 606, and fire notification device 604. In some embodiments, system 800 includes some or all parts of system 500 and may be incorporated partially or completely into BMS 400.

Fire alarm control panel 514 is shown to include communications interface 804 and secondary power supply 806. Secondary power supply 806 may include any AC or DC power source that engages when fire alarm control panel 514 is not operating under normal conditions. For example, voltage loading issues may incur during a building emergency such that an increased amount of power is required to operate system 800. Fire alarm control panel 514 is then switched to operating off secondary power supply 806 to conserve power during the building emergency. In some embodiments, secondary power supply is an axillary output capable of connecting a constant output (e.g., 200 mA, 29 VDC) so operation is maintained during battery backup. In other embodiments, secondary power supply 806 is a built-in battery charger that charges a plurality of chargeable batteries within fire alarm control panel 514. In other embodiments, secondary power supply 806 is a DC power source (e.g., battery).

Communications interface 804 may facilitate communications between network 830, environmental sensor attachment 606, fire notification device 604, or any combination thereof. In some embodiments, communications interface 804 is the IDNAC bus that runs through fire alarm control panel 514. For example, communications line 808 may run from fire alarm control panel 514 to environmental sensor attachment 606 by means of the IDNAC bus. Power line 810 may also run from the IDNAC to environmental sensor attachment 606.

Mounting plate 610 may be installed in similar fashion as shown in FIG. 6. Mounting plate 610 may be coupled to the ceiling or walls of building 10. Additionally, fire notification device 604 may be configured in similar fashion as shown in FIG. 6. Fire notification device 604 may communicate with network 830 or fire alarm control panel 514 through the IDNAC bus.

Environmental sensor attachment 606 is shown to include connection points 812, 814, communications interface 818, sensors 820, and control board 826. Environmental sensor attachment 606 may be responsible for monitoring environmental data in or around a building zone within building 10. In some embodiments, environmental sensor attachment 606 includes a communications infrastructure such as Wi-Fi mesh radios, access points, or other components that form a communications network with network 830. Environmental sensor attachment 606 may also be responsible for storing, processing, and/or transmitting the environmental data to a controller (e.g., fire alarm control panel 514) for further processing and potential fire detection. For example, environmental sensor attachment 606 monitors the ambient temperature of a building zone within building 10 and records temperature readings. When a temperature reading crosses a certain threshold, a signal can be sent wirelessly to fire alarm control panel 514 to initiate action to notify of, detect, and/or suppress a building emergency (e.g., building fire).

In some embodiments, environmental sensor attachment 606 and/or fire alarm control panel 514 may input and analyze some or all of the raw data coming in from various sensors of system 800 to detect a fire. Once a fire is detected, fire alarm control panel 514 may initiate fire suppression and, in some embodiments, environmental sensor attachment 606 and/or fire alarm control panel 514 may send information to BMS controller 366 for further action (e.g., analysis, alarming, status monitoring, etc.). In various embodiments, environmental sensor attachment 606 may send information to BMS controller 366 through network 830 without routing such information through fire alarm control panel 514.

Connection points 812, 814 may provide electrical connection from power line 810 and communication line 808. In some embodiments, connection points 812, 814 may be identical or substantially similar to terminals 612, 614, as shown in FIG. 6. Connection points 812, 814 may be metal prongs that press against a flat metal surface on the conjoining part. In other embodiments, connection points 812, 814 are the flat metal surface that connect to the metal prongs.

Communications interface 818 may facilitate communications between network 830, fire alarm control panel 514, fire notification device 604, or any combination thereof. In some embodiments, communications interface 804 is the IDNAC bus that runs through fire alarm control panel 514 and into the components shown in FIG. 8. For example, communications line 808 may run from fire alarm control panel 514 to environmental sensor attachment 606 by means of the IDNAC bus. Power line 810 may also run from the IDNAC to environmental sensor attachment 606.

Communications interface 818 may also be partially or completely integrated into control board 826. Interface 818 may be responsible for wirelessly transmitting environmental data from sensors 820 to a fire controller (e.g., fire alarm control panel 514, BMS controller 366, etc.). In some embodiments, wireless communication may be performed through a network (e.g., network 830) that utilizes IEEE 802.15.4 ZigBee specifications. Additionally, the plurality of fire notification devices 504-510 as shown in FIG. 5 may communicate through a low power wireless mesh network standard such as ZigBee. In other embodiments, interface 818 may communicate using standard IEEE 802.11 protocols.

Control board 826 may handle all of the processing within environmental sensor attachment 606. In some embodiments, control board 826 is capable of regulating power level, analyzing communication between environmental sensor attachment 606 and the other components in system 800, regulating power supplies, and triggering alarms. Control board 826 may be implemented onto a printed circuit board (PCB) mounted within environmental sensor attachment 606, such that any wireless communication, power regulation, or other applications are performed within environmental sensor attachment 606. Control board 826 may be supplied with power and communications from the IDNAC bus in fire alarm control panel 514. Control board 826 is described in greater detail as shown in FIG. 9.

Sensors 820 is shown to include temperature sensor 822 and humidity sensor 824. Sensors 820 can include, but are not limited to, any sensor capable of monitoring and/or recording environmental data in or around building 10. Temperature sensor 822 may be a sensor component within environmental sensor attachment 606 capable of recording temperature readings within a building zone and sending environmental data to control board 826. In other embodiments, temperature sensor 822 incorporates the features of control board 826 and sends environmental data to fire alarm control panel 514. Humidity sensor 824 may function similarly to temperature sensor 822 but may record different environmental data (e.g., humidity levels).

Network 830 may be identical or substantially similar to network 446 as shown in FIG. 4. Network 830 may be responsible for transmitting information from environmental sensor attachment 606 to fire alarm control panel 514 or to BMS 400. In some embodiments, the some or all of the functionality of network 830 is performed by control board 826. Network 830 may also act as a network connection between system 800 and BMS 400. For example, in the event that system 800 detects a fire within building 10, a signal to initiate emergency action may be transmitted through network 830 to BMS 400. In other embodiments, some or all functionality of network 830 is performed by the IDNAC bus as shown in FIG. 8. Network 830 may act as a means of communication between several fire notification devices with environmental sensor attachments (i.e., nodes, mesh nodes, etc.).

Figure 9:
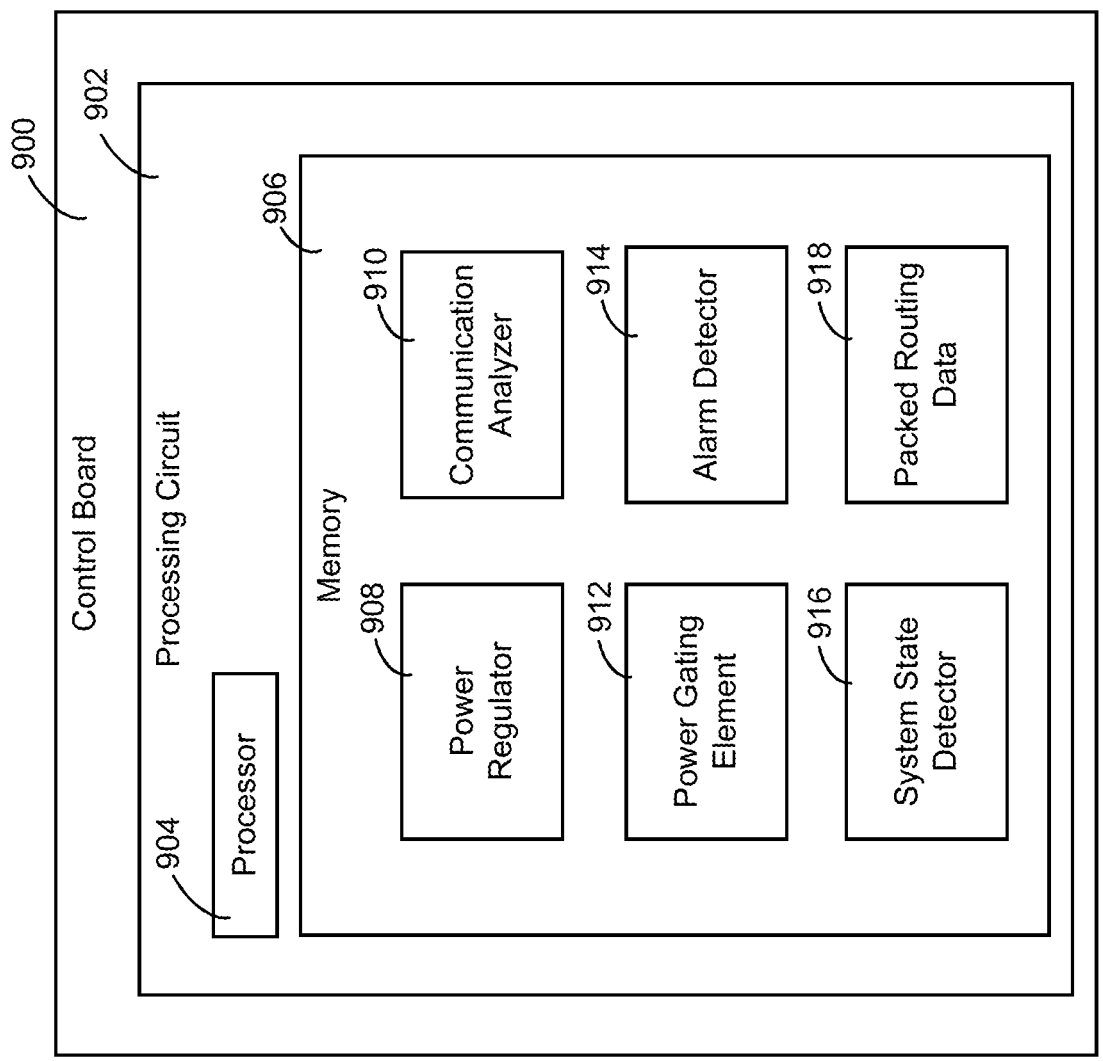
FIG. 9 is a block diagram of a control board, which can be used as part of the fire detection system of FIG. 8, according to some embodiments.

Referring now to FIG. 9, a block diagram of a control board 826 is shown, according to an exemplary embodiment. Control board 826 may resemble the design and functionality of control board 826, as shown in FIG. 8. Control board 826 is shown to include processing circuit 902. Processing circuit 902 is shown to include processor 904 and memory 906.

Processing circuit 902 can be communicably connected to interface 818 such that processing circuit 902 and the various components thereof can send and receive data via interfaces 818. Processor 904 can be implemented as a general purpose processor, an application specific integrated circuit (ASIC), one or more field programmable gate arrays (FPGAs), a group of processing components, or other suitable electronic processing components.

Memory 906 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 906 can be or include volatile memory or non-volatile memory. Memory 906 can include database components, object code components, script components, or any other type of information structure for supporting the various activities and information structures described in the present application. According to an example embodiment, memory 906 is communicably connected to processor 904 via processing circuit 902 and includes computer code for executing (e.g., by processing circuit 902 and/or processor 904) one or more processes described herein.

Memory 906 is shown to include power regulator 908, communications analyzer 910, power gating element 912, alarm detector 914, system state detector 916, and packed routing data 918. Power regulator 908 may be responsible for regulating the amount of power supplied to circuitry in environmental sensor attachment 606 by implementing voltage and/or current regulators. In some embodiments, a constant supply voltage (e.g., 120 VAC) is being supplied by the IDNAC bus to environmental sensor attachment 606. Power regulator 908 may regulate that voltage such that only 29-30 VAC is being supplied to the circuitry.

Communication analyzer 910 is shown handle all of the wireless communication transmitted through environmental sensor attachment 606. In some embodiments, communications analyzer 910 includes a Wi-Fi module on a PCB inside of environmental sensor attachment 606 configured to transmit environmental data from sensors 820 to fire alarm control panel 514. In other embodiments, communications analyzer 910 communicates directly with network 830.

Power gating element 912 may be responsible for transferring the supply power to environmental sensor attachment 606 during a building emergency. A state of emergency in building 10 may be determined if fire alarm control panel 514 is notified of environmental data that is indicative of a dangerous situation for building occupants. During this state, power gating element 912 may switch the primary power of environmental sensor attachment 606 (e.g., IDNAC bus, AC power, etc.) to a secondary supply (e.g., battery). This may be done to utilize more power in certain areas that pertain more to building fire notification and suppression. In some embodiments, the functionality of power gating element 912 may be performed by a building controller (e.g., BMS controller 366, fire alarm control panel 514, etc.). For example, during a building emergency, fire alarm control panel 514 may route power from environmental sensor attachment 606 to different areas of system 800 (e.g., fire notification device 604, fire suppression subsystems, etc.). Environmental sensor attachment 606 can to switch to a secondary power supply (e.g., battery) in this example.

Alarm detector 914 may be responsible for determining if environmental data from sensors 820 are indicative of a building emergency. In this event, alarm detector 914 may send a signal to a fire controller (e.g., fire alarm control panel 514, BMS controller 366, etc.) that notifies building occupants of an emergency. For example, control board 826 may initiate alarm detector 914 that sends an alarm signal (audible notification, strobe lights, etc.) to a fire controller to notify building occupants.

System state detector 916 can be configured to receive, via the link between environmental sensor attachment 606 and fire notification device 604, information regarding the current status for fire system 100. For example, system state detector 916 may determine that no AC power is being received from fire alarm control panel 514 through power and communications 808, 810. In some embodiments, when system state detector 916 identifies that fire system 100 is not being powered by AC power from fire alarm control panel 514, system state detector 916 communicates this information to other components of memory 906. For example, the system state detector 916 communicates a battery backup state or an alarm state of fire system 100 to notify other devices in fire system whether there is an active fire alarm or not in the building. Packed routing data 918 can be configured to store the packets of data sent and received via communications network 830 or via an Ethernet-based communications link. For example, packed routing data 918 may store packets of data that generate a file with an instruction for the environmental sensor attachment 606 to alert client devices within building 10 that the system status of the building is no AC power is being received from fire alarm control panel 514.

Figure 10:
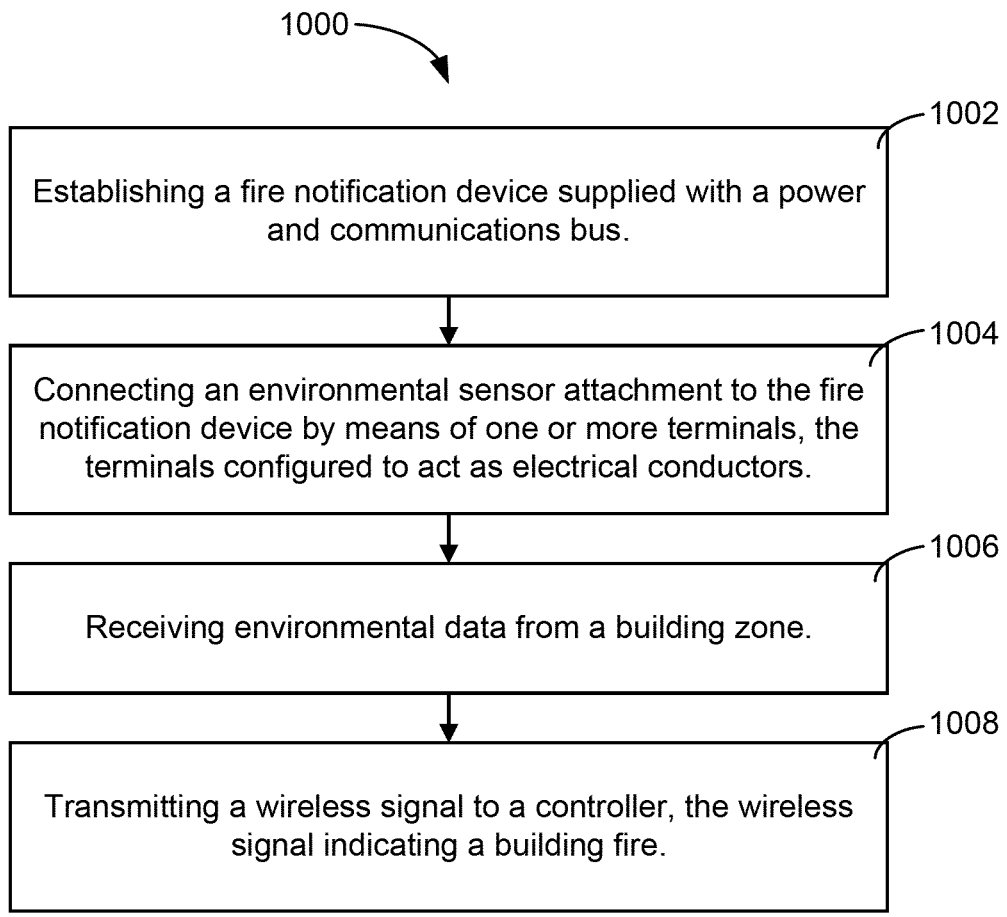
FIG. 10 is a flowchart of a process for detecting a fire that can be performed by the fire detection system of FIG. 8, according to some embodiments.

Referring now to FIG. 10, a process 1000 for detecting fires is shown, according to an exemplary embodiment. Process 1000 can be performed by notification device 604, as shown in FIG. 6. In some embodiments, process 1000 can be performed within system 800 as shown in FIG. 8.

Process 1000 is shown to include establishing a fire notification device supplied with a power and communications bus (step 1002). This step may be performed prior to installing an environmental sensor attachment, such as environmental sensor attachment 606, to a device mounted to a wall or ceiling, or after. In some embodiments, fire notification device 604 is mounted to a wall within building 10, and a service technician modifies the fire notification device 604 by installing attachment 606 into the assembly 600.

Process 1000 is shown to include connecting an environmental sensor attachment to the fire notification device by means of one or more terminals, the terminals configured to act as electrical conductors (step 1004). In some embodiments, connection points (i.e., terminals) are located on both the backside of the fire notification device and the front side of the sensor attachment. For example, environmental sensor attachment 606 may electrically couple to fire notification device 604 by means of terminals 612, 614. Terminals 612, 614 may connected to electrical connector 706 as shown in FIG. 7B.

Process 1000 is shown to include receiving environmental data from a building zone (step 1006). Environmental data may include temperature readings of a building zone, humidity levels, smoke levels, etc. For example, temperature sensor 822 may receive temperature readings from a building zone.

Process 1000 is shown to include transmitting a wireless signal to a controller, the wireless signal indicating a building fire (step 1008). In some embodiments, data is received from an environmental sensor attachment to a controller located within a fire detection system. For example, environmental sensor attachment 606 may wirelessly transmit a signal indicating a building fire to fire alarm control panel 514 based on data received from temperature sensor 822.

Figure 11:
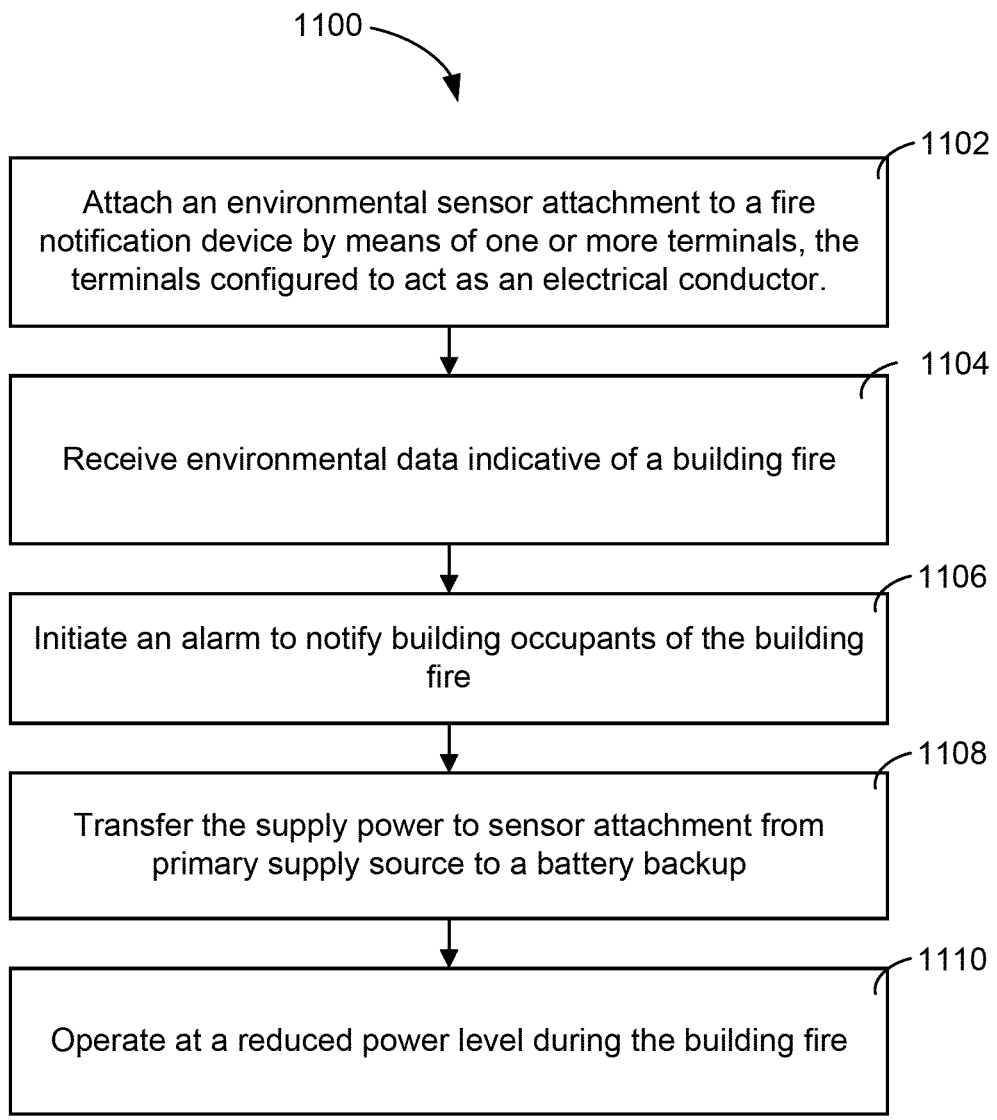
FIG. 11 is a flowchart of a process for detecting and responding to a fire that can be performed by the fire detection system of FIG. 8, according to some embodiments.

Referring now to FIG. 11, a process 1100 for detecting a fire within a building is shown, according to an exemplary embodiment. Process 1100 can be performed in part or completely by system 800 as shown in FIG. 8. In some embodiments, process 1100 is performed with a modified fire notification device assembly, such as assembly 600 as shown in FIG. 6.

Process 1100 is shown to include attaching an environmental sensor to a fire notification device by means of one or more terminals, the terminals configured to act as an electrical conductor (step 1102). Step 1102 may include attaching environmental sensor attachment 606 to fire notification device 604. In some embodiments, the terminals may allow for an electrical connection that continues an electrical circuit for power and/or communication lines. For example, connection points 812, 814 may act as electrical conductors to connect power and communication lines from 812, 814 from device 604 to environmental sensor attachment 606 by means of the IDNAC bus.

Process 1100 is shown to include receiving environmental data indicative of a building fire (step 1104). Environmental data (e.g., temperature, humidity, etc.) may be monitored or recorded by environmental sensor attachment 606. For example, temperature sensor 822 may receive temperature readings of the surrounding air in a particular building zone within building 10. The temperature readings may be higher that a given threshold that, when crosses, indicates to a fire controller (e.g., fire alarm control panel, BMS controller, etc.) of a potential fire within that building zone.

Process 1100 is shown to include initiating an alarm to notify building occupants of a building fire (step 1106). In some embodiments, initiating an alarm may include notifying a central controller (e.g., fire alarm control panel, BMS controller, HVAC controller, etc.) of a potential building emergency so corrective action (i.e., fire suppression, alarming first responders, etc.) may be enacted. This step may include changing the state of the sensor attachment to an "emergency mode." For example, when environmental sensor attachment 606 receives environmental data indicative of a building fire, changes in control board 826 as shown in FIG. 9 may be enacted. This may include engaging alarm detector 914. In other embodiments, this may include initiating power gating element 912 to efficiently distribute power where necessary during a building emergency.

Process 1100 is shown to include switching from using a primary power supply to using a secondary power supply to power the environmental sensor attachment (step 1108). This step may include transferring all power from primary power to secondary and allowing the environmental sensor attachment to operate completely off of battery backup. In other embodiments, the environmental sensor attachment may be disabled in the event of a building emergency. For example, power gating element 912 may switch to a battery backup for environmental sensor attachment 606 in the event of a building emergency. In another example, power gating element or another component of control board 826 may shut down (i.e., disable) environmental sensor attachment 606 in the event of a building emergency. This may allow suppression and/or notification parts (e.g., audible alarms, strobe lighting, etc.) to operate more efficiently during a building emergency.

Process 1100 is shown to include operating at a reduced power level during the building fire (step 1110). In some embodiments, certain portions of environmental sensor attachment 606 (e.g., temperature sensor, etc.) may not need to be utilized as much during a building emergency. This may result in a transfer of power from certain components within environmental sensor attachment 606 to other parts of system 800.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A sensor apparatus for integration with a building fire system, the sensor apparatus comprising:
    a first housing comprising a first mounting interface configured to physically couple to a mounting surface and comprising a first power connector configured to receive power from the building fire system, the first housing configured to physically engage a second housing of a fire system component of the building fire system and transfer power between the sensor apparatus and the fire system component via respective power connectors located along the first housing and the second housing that make electrical contract with each other when the first housing physically engages the second housing; and an environmental sensor electrically coupled to the first power connector and configured to use the power from the building fire system to monitor environmental conditions of a building.

2. The sensor apparatus of claim 1, further comprising a second mounting interface configured to physically couple to a fire system component and comprising a second power connector configured to provide power to the fire system component.

3. The sensor apparatus of claim 2, wherein the fire system component is a fire notification device or a fire detection device of the building fire system.

4. The sensor apparatus of claim 2, wherein:
the fire system component comprises a third mounting interface configured to physically couple to the mounting surface; and
the first mounting interface of the sensor apparatus is configured to emulate the third mounting interface to enable the sensor apparatus to be physically coupled to the mounting surface.

5. The sensor apparatus of claim 4, wherein:
the mounting surface comprises a fourth mounting interface configured to physically couple to the third mounting interface of the fire system component; and
the second mounting interface of the sensor apparatus is configured to emulate the fourth mounting interface to enable the sensor apparatus to be physically coupled to the third mounting interface of the fire system component.

6. The sensor apparatus of claim 1, wherein
the mounting surface is a second mounting interface of a fire system component, the second mounting interface configured to physically couple to the first mounting interface and comprising a second power connector configured to provide the power from the building fire system to the sensor apparatus.

7. The sensor apparatus of claim 1, further comprising a control board configured to:
electrically couple an environmental sensor to the first power connector;
determine a state of the building fire system based on environmental data received by the environmental sensor; and
selectively provide the power from the building fire system to the environmental sensor based on the state of the building fire system.

8. The sensor apparatus of claim 7, wherein the state of the building fire system is a battery backup state and wherein the control board is configured to:
determine that the power from the building fire system is being received and that the power is not from a backup battery of the building fire system; and
operate the sensor apparatus and the fire system component on the power from the building fire system in response to determining that the power from the building fire system is not from the backup battery.

9. The sensor apparatus of claim 1, wherein the environmental sensor is further configured to monitor temperature readings or humidity levels from within the building.

10. The sensor apparatus of claim 1, wherein the power from the building fire system is a wired input from a fire panel Initiating Device Notification Appliance Circuit (ID-NAC) bus.

11. A building fire system comprising:
a fire system component configured to operate on power from the building fire system;
a sensor apparatus comprising an environmental sensor configured to:
physically couple to the fire system component such that the sensor apparatus is powered by the power from the building fire system;
monitor an environmental condition of air within a building zone by means of the environmental sensor;
detect a loss of power from the building fire system;
determine whether an amount of energy in a backup battery of the fire system component is sufficient to power both the fire system component and the sensor apparatus; and
shut down the sensor apparatus in response to determining that the amount of energy in the backup battery is insufficient to power both the fire system component and the sensor apparatus.

12. The building fire system of claim 11, wherein the sensor apparatus comprises:
a first mounting interface configured to physically couple to a mounting surface and comprising a first power connector configured to receive power from the building fire system; and
a second mounting interface configured to physically couple to the fire system component and comprising a second power connector configured to provide power to the fire system component.

13. The building fire system of claim 12, wherein:
the fire system component comprises a third mounting interface configured to physically couple to the mounting surface; and
the first mounting interface of the sensor apparatus is configured to emulate the third mounting interface to enable the sensor apparatus to be physically coupled to the mounting surface.

14. The building fire system of claim 11, wherein the environmental sensor is further configured to monitor temperature readings or humidity levels from within the building zone.

15. A method for powering a plurality of sensor apparatus using power from a building fire system, the method comprising:
operating a fire system component on the power from the building fire system;
physically coupling a sensor apparatus to the fire system component such that the sensor apparatus is powered by the power from the building fire system;
conducting, by the sensor apparatus, environmental monitoring with one or more environmental sensors using the power from the building system for detecting a fire condition;
detecting a loss of the power from the building fire system;
determining whether an amount of energy in a backup battery is sufficient to power both the fire system component and the sensor apparatus; and
shutting down the one or more environmental sensors in response to determining that the amount of energy in the backup battery is insufficient to power both the fire system component and the sensor apparatus.

16. The method of claim 15, wherein the one or more environmental sensors are configured to monitor temperature readings or humidity levels from within a building.

17. The method of claim 15, wherein the fire system component is a fire suppression device, a fire notification device in a fire notification system, or a fire detection device in the building fire system.

18. The method of claim 17, wherein a wired connection of the sensor apparatus to the fire notification system or the building fire system is an auxiliary connection.

\* \* \* \* \*